May 23, 1967 R. DENES 3,320,747
HYDROKINETIC DRIVE
Filed Sept. 10, 1965 6 Sheets-Sheet 1

VORTICAL MOTION

INVENTOR
ROBERT DENES
BY Joseph W. Mallea
ATTY.

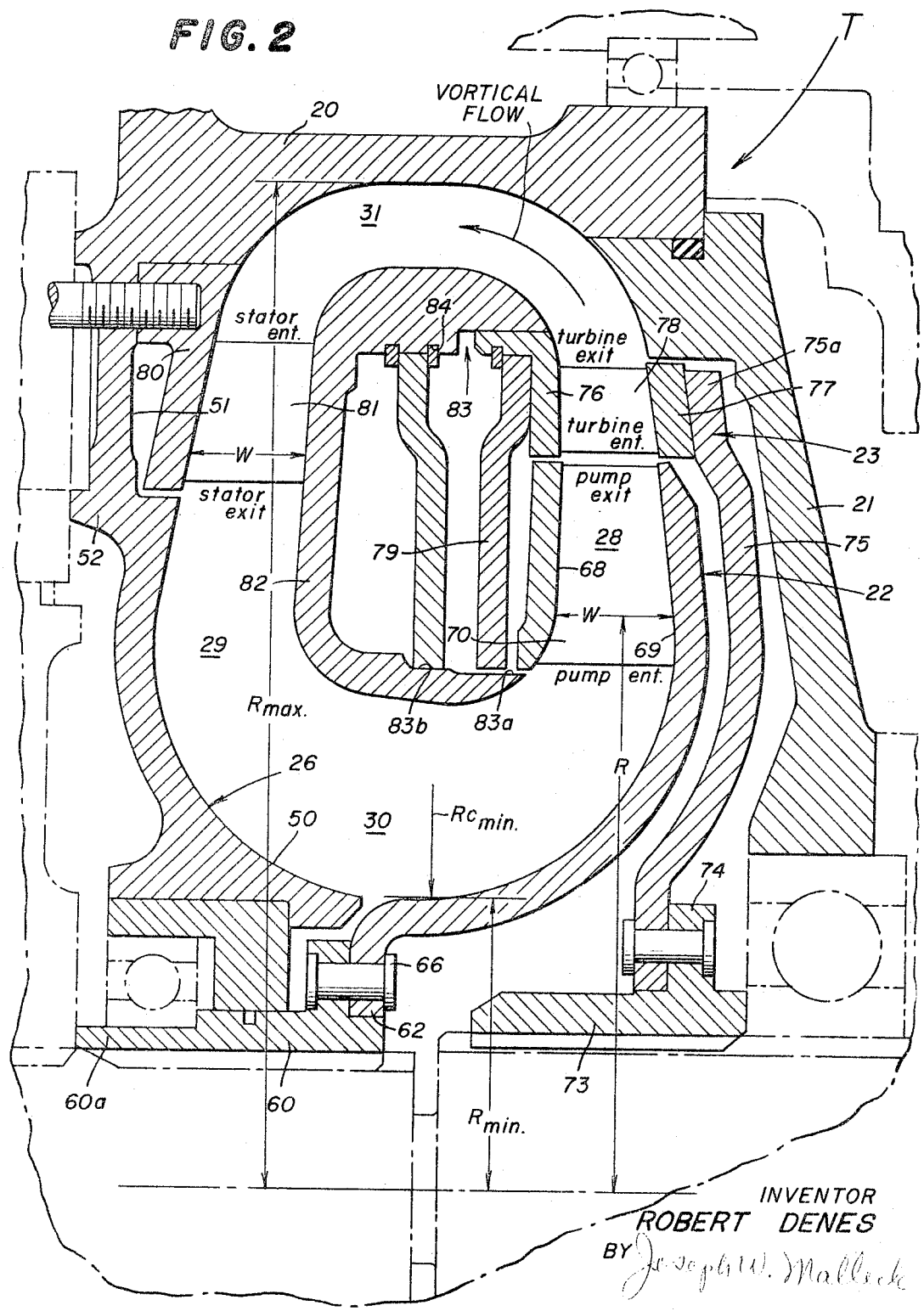

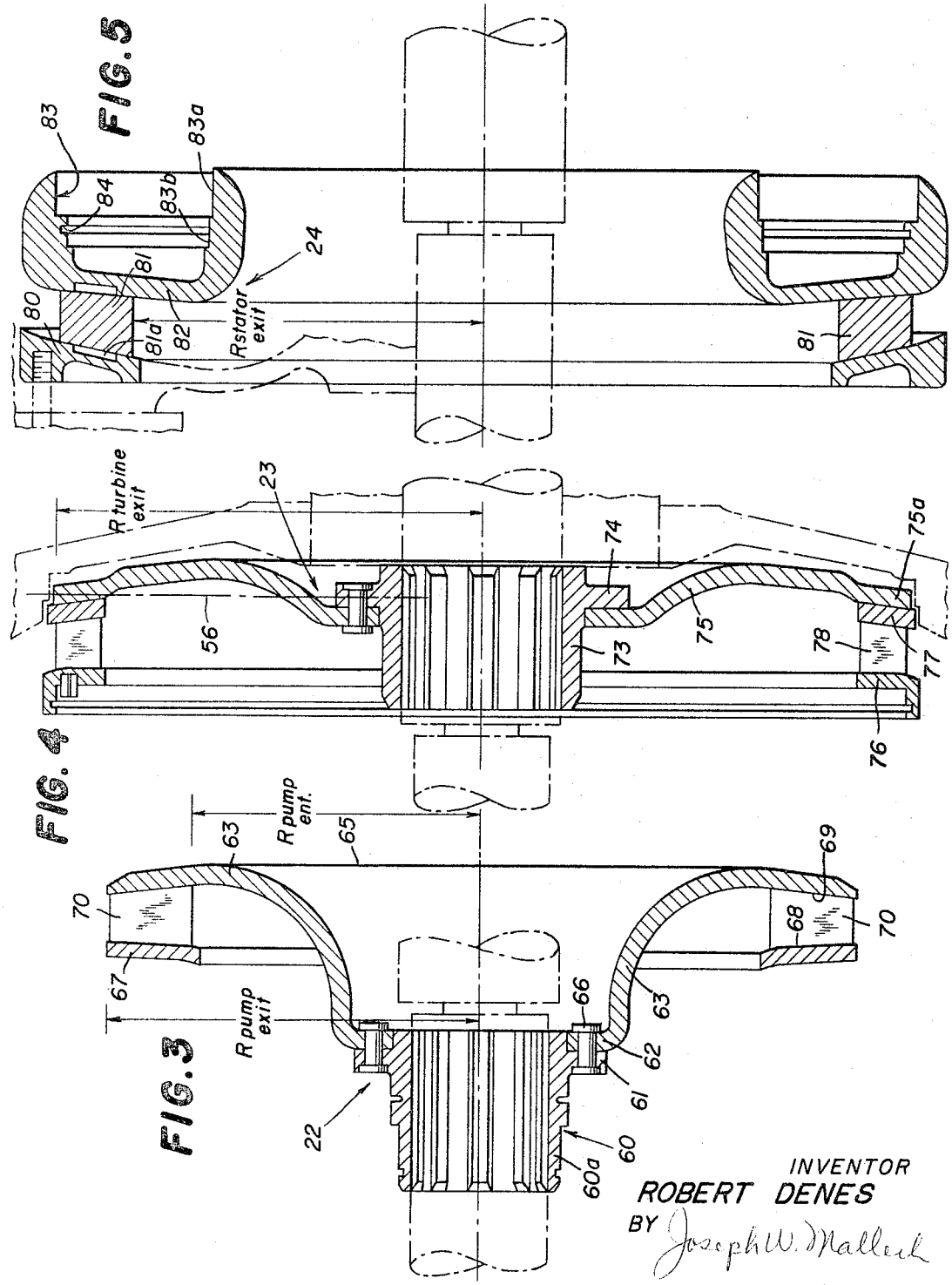

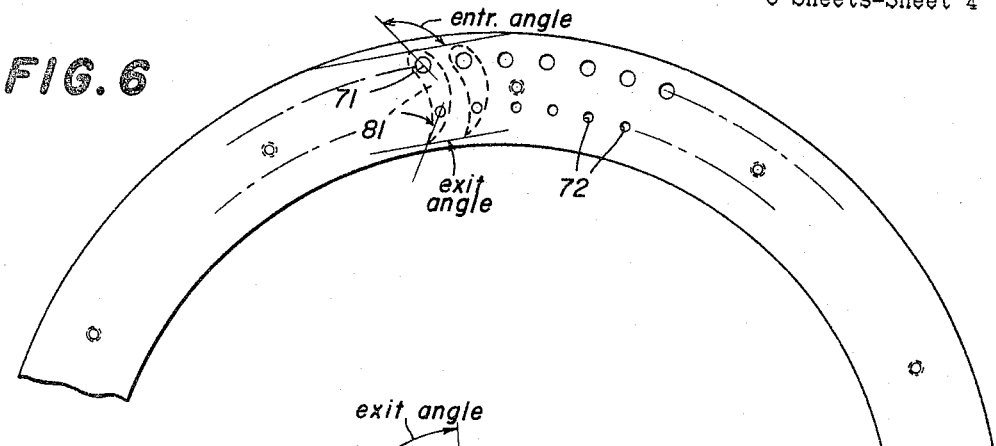
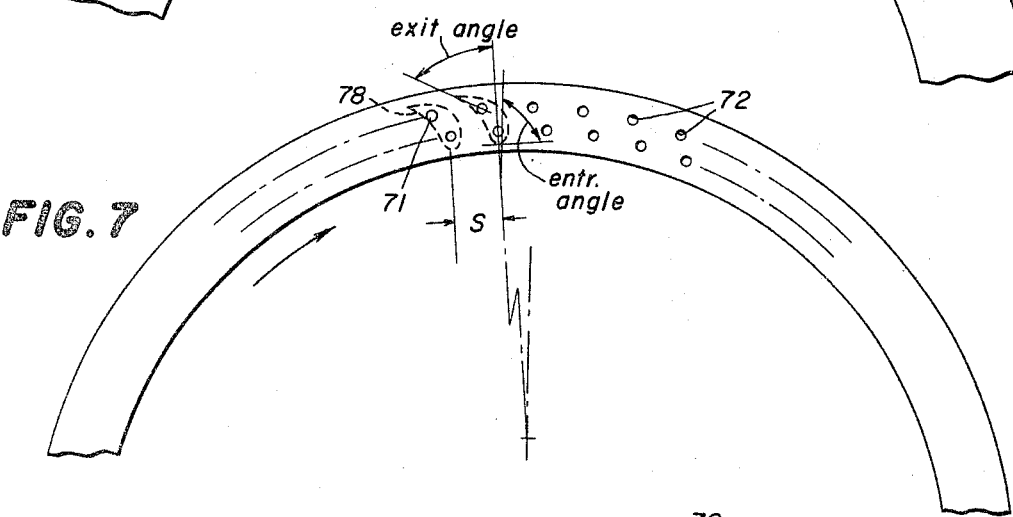
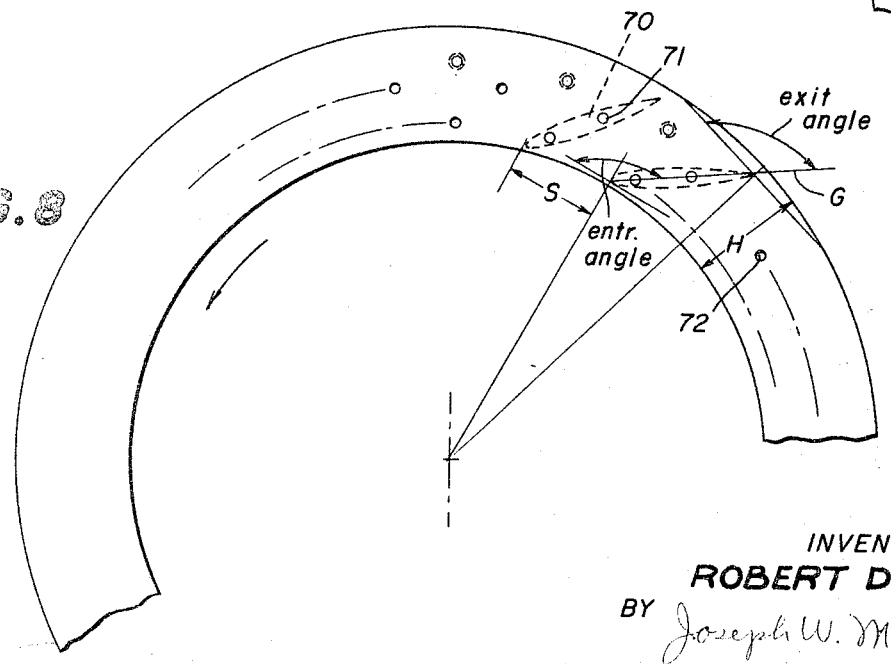

May 23, 1967 R. DENES 3,320,747
HYDROKINETIC DRIVE

Filed Sept. 10, 1965 6 Sheets-Sheet 5

United States Patent Office 3,320,747
Patented May 23, 1967

---

3,320,747
HYDROKINETIC DRIVE
Robert Denes, Rockford, Ill., assignor to Borg-Warner Corporation, Chicago, Ill., a corporation of Illinois
Filed Sept. 10, 1965, Ser. No. 486,500
4 Claims. (Cl. 60—54)

This invention relates to a torque converter with a single stage turbine and a stationary housing, the torque converter being generally used for heavy duty industrial and tractor power trains. This converter has uni-directional rotation with the sequence of the working elements taken with respect to the vortical flow, being pump, turbine, and stator.

The main objective of this invention is to provide the above industry with a torque converter of the above type having an improved efficiency range accompanied by an improved peak efficiency. The attainment of such object would enable the torque converter to be equally suitable to work either in series, parallel, or compound relationship with the gear drive of a transmission; such versatility has not been completely possible with prior art torque converters. A related object is to provide a torque converter having a generally constant torque absorption characteristic, i.e., the torque absorbed by the pump element from the driving motor will remain approximately constant at any given speed ratio of the torque converter within the useful range of operation. This is particularly important in industrial power trains, since the operator can utilize full engine power at any load condition without fear that the turbine load will be reflected to the pumping element.

There are certain corollaries that automatically follow from the statement of the main object and which define other operating characteristics. For example, in order to have a wider efficiency range, the efficiency both at the lower speed ratios and at the higher speed ratios must be improved. The typical efficiency curve (representing efficiency plotted against speed ratio) has a generally parabolic configuration and thus improvement of the efficiency at low speed ratios automatically means that a higher stall torque ratio is necessary since stall torque ratio is the directional tangent of such curve at the origin. In other words, the steeper the directional tangent, the higher the stall torque ratio.

Structural features contemplated by this invention which result in an improved stall torque ratio, comprise a novel definition of the toroidal chamber or channels directing the fluid flow and improved blade or vane definition of the various wheeled elements to increase the rate of circulatory flow at the stall condition.

There have been relatively recent attempts in the prior are to provide single stage turbine torque converters with higher stall torque characteristics with little attention to an improved utility range. This invention contemplates improvement of the broader aspects of efficiency while at the same time improving the stall torque characteristics.

To achieve high mid-range efficiency or high peak efficiency, a reduced rate of circulatory flow is necessary while at the same time hydraulic losses in the converter must be reduced. To this end, the invention herein contemplates providing a relatively unrestricted or unchoked throat area through the turbine element while at the sametime providing a maximum choke or restriction to the circulatory flow at the stator element. The choke at the stator element is achieved by giving greater attention to the definition of the toroidal channel walls and their cooperation with the stator vanes.

To increase efficiency at the high speed ratios requires a high race-away speed ratio for the turbine element which in turn means that the torque converter must be capable of operating in speed ratios greater than 1:1. Furthermore, the rate of circulatory flow must be maintained generally constant and at a positive value at speed ratios greater than 1:1. The use of relatively shorter stator blades or vanes than have heretofore been contemplated, the provision of a long radial free vortex flow before the pump element entrance combined with an improved toroidal flow section through the pump with turbine elements has resulted in the attainment of increased efficiency at high speed ratios.

Other objects and advantages of this invention will become more apparent from the following detailed description taken in connection with the accompanying drawings in which:

FIGURE 2 is a greatly enlarged cross-section of the torque converter of FIGURE 1;

FIGURE 3 is an enlarged view of the impeller element as illustrated in section in FIGURE 1;

FIGURE 4 is an enlarged sectional view of the turbine element assembly and other related parts in phantom outline;

FIGURE 5 is an enlarged sectional view of the stator element assembly and also illustrating other related parts shown in phantom outline;

Figure 9:
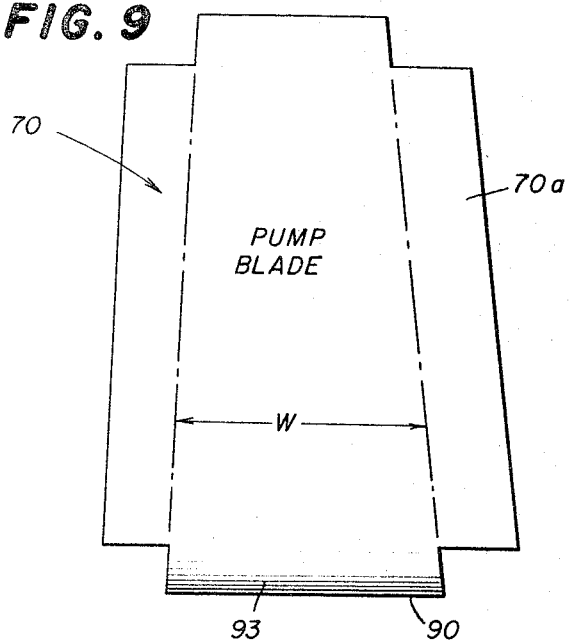
Figure 10:
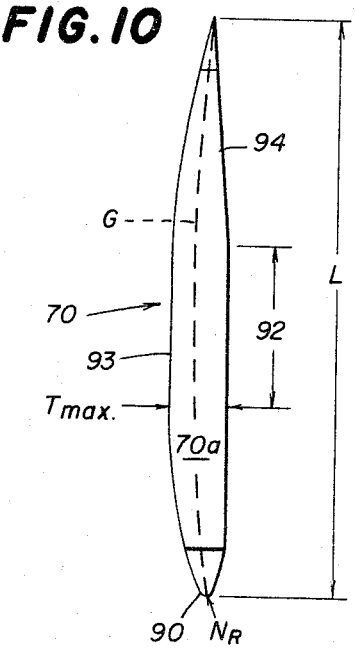
Figure 11:
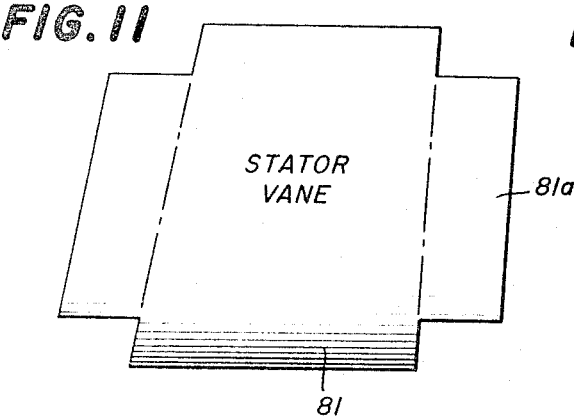
Figure 12:
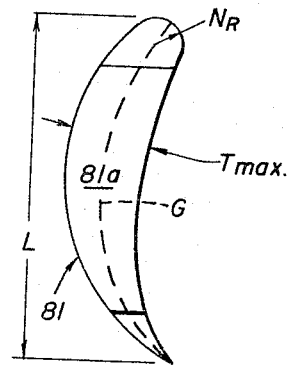
Figure 13:
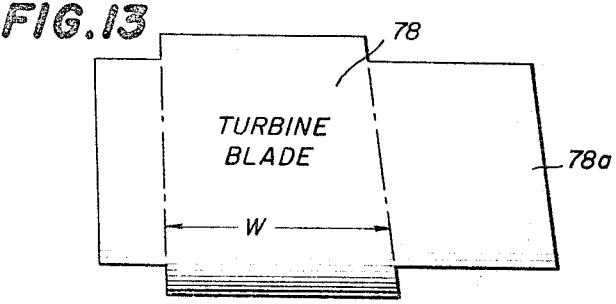
Figure 14:
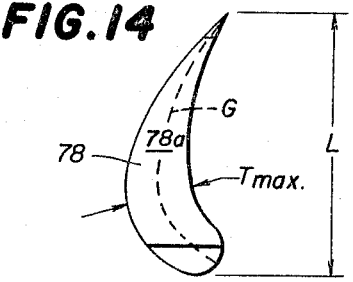
Figure 15:
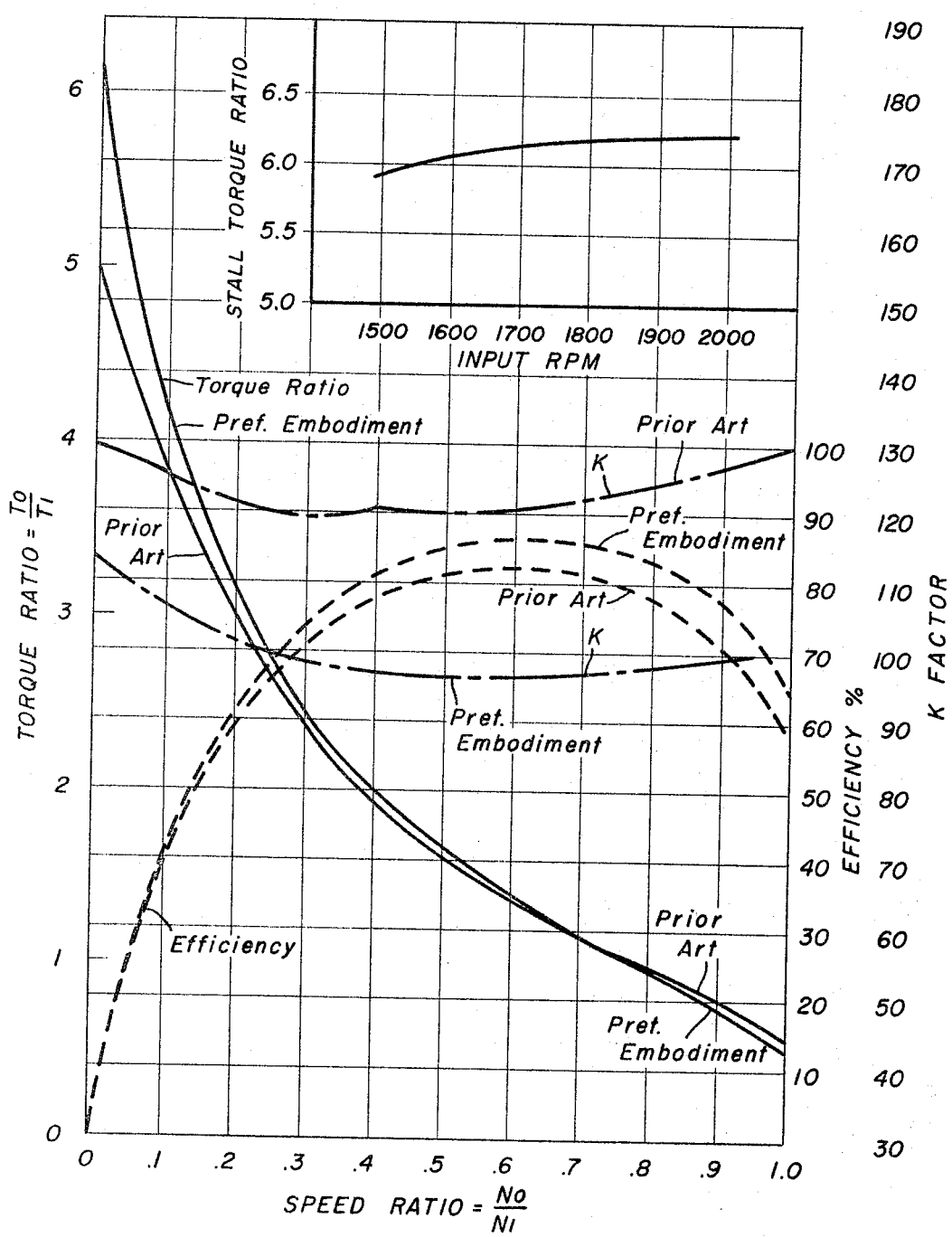

FIGURES 6–8 respectively illustrate fragmentary elevational views of the stator element, turbine element, and pumping element; a portion of the blades or guide vanes are shown respectively for each of the assemblies;

FIGURES 9, 11, and 13 respectively show greatly enlarged plan views of the pumping element, stator element and turbine element;

FIGURES 10, 12, and 14 illustrate side elevational views of the respective blades shown in FIGURES 9, 11, and 13; and FIGURE 15 is a graphical illustration of the various operating characteristics of the torque converter of this invention; an inset chart illustrates stall torque ratio plotted against input r.p.m.

Figure 1:
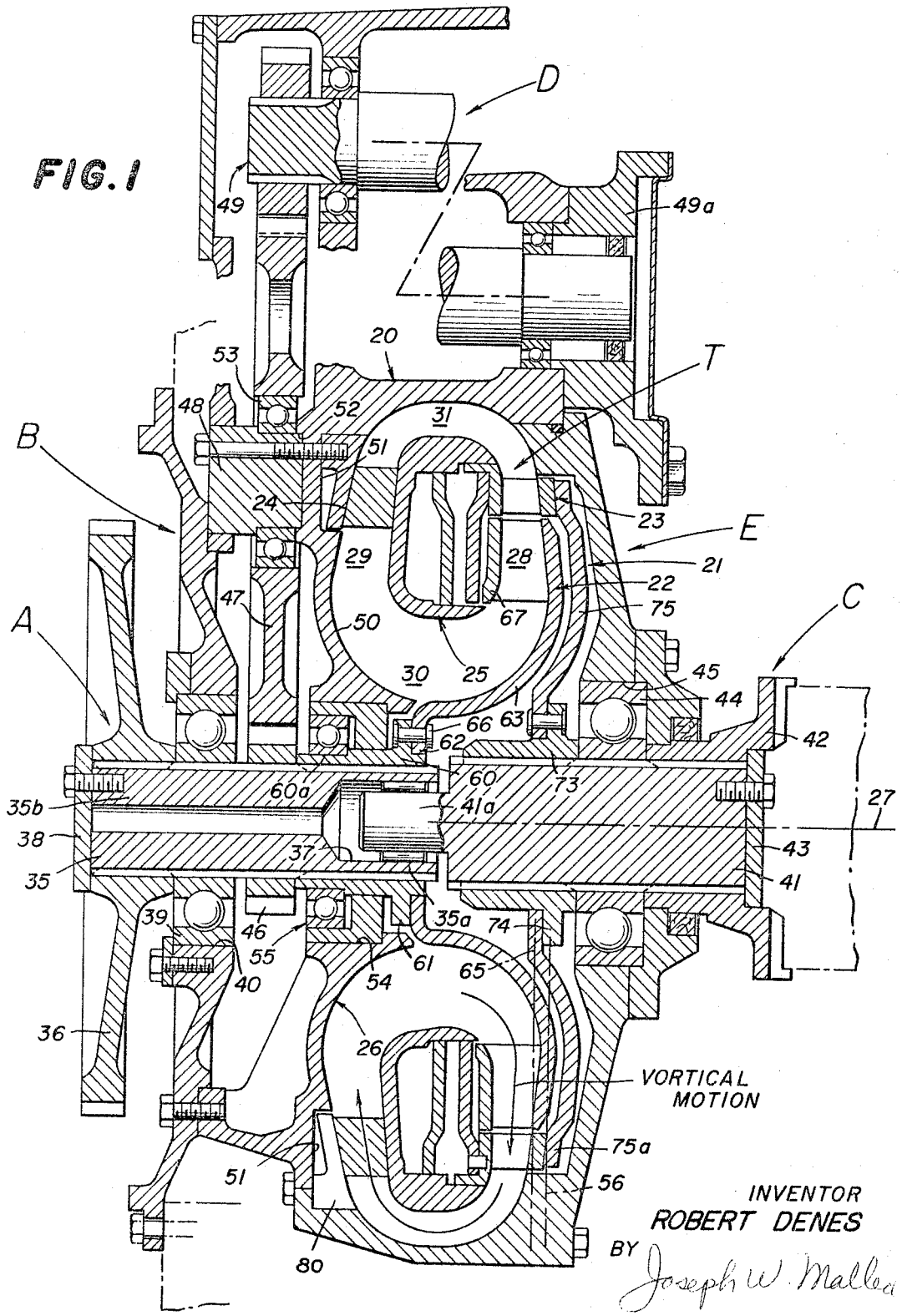
FIGURE 1 is a central elevational and sectional view of a transmission employing a single staged turbine torque converter incorporating the principles of this invention.

Turning now to the drawings and particularly to FIGURE 1, there is illustrated a preferred embodiment of this invention wherein a portion of the overall transmission is shown incorporating a torque converter and auxiliary power take-off. It is understood that the torque converter of this invention is particularly adaptable, by features disclosed herein, to be used with mechanical transmission components either in series or compound, in addition to a parallel arrangement. Heretofore, parallel or split torque type hydraulic transmissions have been predominantly considered because the combination tends to increase the maximum overall efficiency of the transmission as a whole, as compared with the maximum efficiency developed by the torque converter component alone. This invention, by virtue of improvement of the converter characteristics per se, expands the versatility of the converter component into other areas.

Broadly, the transmission comprises a rotatable driving input assembly A journalled in a fixed transmission housing B (only a part of which is shown here), and a rotatable output assembly C journalled in the torque converter housing E. A mechanical auxiliary take-off assembly D and a hydraulic torque converter T, both of which receive torque from the input assembly A.

The torque converter housing has front and rear portions 20 and 21 which substantially define a toroidal fluid chamber 26, with the pump, turbine, and stator elements (22, 23, and 24) completing the chamber definition. An inner toroidal core 25 is carried by the respective elements for guiding fluid flow in the chamber. The fluid flow basically has two motion components, one a general circulation about the axis 27 of he toroidal chamber which is coincident with the axis of the input and output assemblies, and the other a vortical flow which is circulatory about the core 25; these motions combine together to provide a spiral-like flow pattern through the toroidal chamber. The discussion which follows focuses on section of the vortical flow, wherein there is generally a radial out-flow section 28 and a generally radially inward flow section 29, each of the radial sections being connected by return bends 30 and 31 which are substantially axial taken with respect to the axis 27 of the toroidal chamber.

Turning now more particularly to the components of the transmission, the input assembly A comprises an input shaft 35 carrying a gear 36 adapted to be coupled to a prime mover (not shown), one end 35a of the input shaft has a recess 37 for journalling the forward portion of the output assembly C. The other end 35b of the input shaft carries a retainer plate 38 for positioning the input gear 36 thereon. Shaft 35 is journalled within bearing 39 received in an opening 40 of housing B.

The output assembly C has a cylindrical shaft 41 provided with a nose 41a which is rotatably journalled within the recess 37 of the input assembly and carries a yoke 42 drivingly splined thereto; the yoke is retained in axial position by a plate 43 at the rear portion thereof. Shaft 41 is rotatably journalled by a bearing 44 received in an opening 45 of the torque converter housing.

The take-off assembly D has a spur gear 46 drivingly connected with the input shaft 35 and is in mesh with an idler gear 47 carried by an idler shaft 48 supported between the front portion of the transmission housing and the front portion 20 of the torque converter housing; the idler gear 47 is in turn in mesh with one gear of a counter shaft assembly 49 which carries a take-off yoke 49a at its opposite end.

The front portion 20 of the torque converter housing has a shell-like configuration with an internal surface 50 cooperating to define the toroidal fluid chamber 26; the surface is smoothly curved and has an annular recess 51 for mounting a portion of the stator element 24 therein. An annular shoulder 52 is effective to journal the idler shaft 48 and bearing 53. The front portion 20 has a central opening 54 effective to fit bearing assembly 55 journalling the input shaft 35. The rear portion 21 of the torque converter housing nests within the front portion and has central opening 45 fitting bearing 44 journalling the output shaft 41.

The pump element 22 comprises (see FIGURE 1 or 3) a hub 60 drivingly splined to the rear portion of the input shaft 35 and has a sleeve portion 60a interposed between the bearing assembly 55 and shaft 35; hub 60 has a radially outwardly extending flange 61 adjacent its rear portion for receiving an annular lip 62 of the gently curved wall 63 defining a portion of the toroidal fluid chamber. The wall 63 terminates in a general radial plane 65 (see FIGURE 1) offset from the hub; the lip 62 and flange 61 are coupled together by suitable fasteners 66 such as rivets. The pump element has an inner or core wall 67 cooperating with the curved outer wall 63 to define internal surfaces 68 and 69, respectively (see FIGURE 2). Pump blades 70 are arranged in a circumferentially spaced manner to form a ring (as shown in FIGURE 9). The pump blades extend across the channel parallel to the axis of rotation and may be held in position by at least one pair of pins extending through the profile of the blade and into sockets of the adjacent walls or the blades may have wings 70a (see FIGURE 9) formed as truncated portions of the blade profile, effective to fit snugly in complementary shaped sockets 70b in walls 63 and 67.

The turbine element 23 is composed (see FIGURE 2 or 4) of a hub 73 carrying a radial flange 74 to which is fastened a suporting wall 75 which extends adjacent to and along the wall 63 of the pump and terminates radially outwardly thereof. The hub 73 is drivingly splined to the forward portion of the driven shaft and the outer periphery 75a of the wall lies in a plane 56 (see FIGURE 1) common with the flange 74 of the hub. Wall 75 carries rings 76 and 77 with turbine blades 78 extending therebetween (see FIGURE 2). The ring 76 constitutes a core wall and is L-shaped in cross-section to journal a balance plate 79 as will be further described. The blades 78 are somewhat centered over the hub and are not offset as in the case of the pump element.

The stator element 24 comprises a mounting ring 80 which fits within the recess 51 of the front portion of the torque converter housing and is coupled thereto by suitable fasteners extending thereinto. The ring 80 carries wall 82 between which are disposed a plurality of circumferentially arranged guide vanes 81 (see FIGURE 2) each held in position by at least one pair of pins or rivets extending transversely therethrough. Wall 82 constitutes a core and is rather thick compared with the other core walls; wall 82 has a stepped bore 83 with a first cylindrical portion 83a and a second portion 83b within which is defined sealing ring grooves 84.

Channel definition

The toroidal chamber 26 defined by the housing E and the bladed or vaned elements (22, 23, and 24) is constructed to accommodate movement of fluid therein, as stimulated by the pump element, with a spiral-like flow composed of a circulatory motion about the axis 27 of the chamber and a vortical motion about the inner circular core 25. With particular emphasis upon the vortical flow or motion, the channel, as viewed in cross section of FIGURES 1 and 2, comprise a radial outflow section 28 (radial being taken with respect to the axis 27 of the toroidal chamber), a radial inflow section 29, the radial sections being connected by smoothly curved return bend sections 30 and 31. To define the radial outflow sections 28, the interior dimension W between the outer and inner walls is important since the bladed elements therein are two-dimensional and have a lateral extent which is generally parallel to the axial direction of the torque converter. The distance W gradually changes in such a way that at any radial distance R from the axis of rotation, within the straight-walled portion of the pumping element, the product of RW will remain generally constant; furthermore, the ratio of the square of the maximum torus radius $R_{max.}$ to the sum of the above product at the entrance and exit of the pumping element is substantially five. These relationships may be expressed mathematically as follows:

(1)             RW remains constant (2)
$$\frac{R_{max.}^2}{(\overline{RW})_{ent.} + (\overline{RW})_{exit}} = 5$$

At any one radial distance R from the axis of rotation within the straight walled portion of turbine element, the product of this radial distance R and the axial distance or width W between the two inner walls is substantially constant; furthermore, the ratio of the square of the maximum torus radius to the sum of the above product of the entrance and exit of the turbine element is substantially 4.6. The pumping element is located in the radial outflow section 28 close to the axis of rotation in such a way that the ratio of the fifth power of the maximum torus radius $R_{max.}$ to the fifth power of the pumping element exit radius $R_{pump\ exit}$ is generally 4.8; the turbine is located in the outflow section next to the impeller but radially outwardly therefrom in such a way that the ratio of the fifth power of the turbine exit radius $R_{turbine\ exit}$ to the pumping element exit radius $R_{pump\ exit}$ is generally 1.9 or less. From the above, it can be seen that the radial outflow section has a definite convergence in a radial outward direction.

The radial inflow section 29, which receives the stator element, has the core wall 82 supported and defined so that the dimension W varies in such a way that:

(A) At any one radial distance R from the axis of rotation, within the stator element, the product of this radial distance between the two walls increase in the direction of the vortical flow in a way that the product at the stator exit is about 10% larger than at the entrance (10% divergence from entrance to exit); furthermore, the ratio of the square of the maximum torus radius to the sum of the above product at the stator entrance and exit is substantially 4.2:

$$\frac{R_{max.}^2}{(RW)_{ent.} + (RW)_{exit}} \sim 4.2$$

(B) The stator element is located in the inflow section in such a way that the ratio of the fifth power of the pump exit radius $R_{pump\ exit}$ to the stator exit radius $R_{stator\ exit}$ is generally 1.05 (essentially 1 or larger).

(C) The radial inflow section provides a bladeless space immediately trailing the stator exit and radially inward thereof where the essentially free vortex flow passes through a continuing diverging channel before it enters the return bend section 30 at the innermost part thereof, thus increasing the peripheral velocity component of the vortical flow.

The radial flow sections of the torus are connected by return bends, where the flow is essentially axial; in order to prevent too high a peripheral flow velocity component in the axial flow section:

(A) The minimum radial distance $R_{min.}$ of the torus from the axis is restricted in such a way that the ratio of the maximum radius $R_{max.}$ to the minimum radius $R_{min.}$ of the toroidal chamber is substantially 2.8.

(B) The ratio of the minimum radius $R_{min.}$ of the torus to the radius of curvature $Rc_{min.}$ of the torus wall at and near the axis of rotation is substantially 1.2 or smaller.

(C) The return bend sections do not accommodate blading or vanes in the preferred embodiment; however, the entrance of the pumping element may have blades which partially occupy the inner return bend section 30.

*Blade or vane definition*

The ring of pumping blades form a cascade which is comprised of a plurality of streamlined two-dimensional blades. The pump element blades 70 each have upper and lower surfaces 93 and 94, as shown in FIGURES 9 and 10, which converge to form nose 90 (as opposed to being gently rounded) with a substantially longer length L than either the turbine blades 78 or stator vanes 81. The profile is characterized by a camber line G which has little curvature; a section 92 along the length has little variation in thickness and is the maximum thickness $T_{max.}$ of the blade. The thickness ratio of the pump element blade (thickness ratio camber line length to the maximum thickness of the blade) is approximately 10, while the nose ratio (being the maximum thickness of the blade over the nose radius $Nr$) is approximately 9. The pitch ratio of the pump element blade, being the ratio of the radial length H (see FIGURE 8) of the blade cascade to the spacing S between the blades measured at the entrance thereof, is approximately 1.1 to 1.5. For maximum utility range, the pumping element blades have an exit angle ranging between 115 degrees to 130 degrees. The entrance angle of the pumping element blade is approximately 136 degrees to 151 degrees, with an angle of flow deviation of approximately 21 degrees, the cascade of pumping blades being approximately 24 in number. The blade angles for the pump element is measured between the mean camber line at the entrance or exit with the tangent to the edge radius passing through the respective entrance or exit.

The turbine blade cascade is comprised of approximately sixty blades 78, each being of the impulse type wherein they receive their kinetic energy primarily from the impact of the dynamic fluid flow, as opposed to the common usage of bucket type blades wherein the blades are moved by virtue of entrapment of the fluid through a rather sharp bend of the blade, much in the fashion of a wind-mill. The turbine blades can be characterized as streamlined and have a thickness ratio of $G/T_{max.}$ which is approximately 4, a nose radius ratio $T_{max.}/Nr$ approximately 3.33 and a pitch $L/S$ of approximately 1.12. The blade contour is developed by a boundary criteria of 16 degrees at the tail-end angle.

The spacing of the turbine blades 78 which results in a specific pitch ratio $L/S$ depends upon the convergence of the side walls among other factors. In order to offer the minimum possible overlap of the blades for the given exit angle, a pitch ratio of 1.12 was found necessary. The entrance angle of the turbine blades is in the range of 50–55 degrees with the angle of flow deviation being approximately 107 degrees; the exit angle of the turbine blades being approximately 157–172 degrees.

The stator cascade is made up of a plurality of approximately sixty-five vanes 81, each of the streamline type. The stator vanes have a thickness ratio $G/T_{max.}$ which is approximately 4.75, a nose radius ratio of approximately 4.33 and a pitch ratio of 2.0 at the blade entrance. The stator vanes have an entrance angle of approximately 45 degrees, taken with respect to a radius and provide approximately 85 degrees of flow deviation.

*Throttling of the circulary flow*

A specific feature of this invention is the pinching or placement of the maximum restriction to the vortical flow at the stator element, as opposed to the restriction being at the turbine element characteristic of the prior art. The spacing of the stator vanes is such that, at the maximum thickness of the blade $T_{max.}$, about 60% of the total entrance flow area is obstructed by the vanes in cooperation with the adjacent diverging channel walls, thus providing a pitch ratio of 2.0 at the stator vane entrance. The throat area through this maximum restriction results in an increase in the utility ratio (which is significantly better than has heretofore been accomplished by the prior art). In the turbine element, the pitch ratio was selected to offer the minimum possible overlapping of the blades for the given exit angle. At the maximum thickness of the profile of the turbine blades, approximately 38% of the meridional flow at the turbine entrance is obstructed, the latter being less than the maximum restriction at the stator element and thereby has a relatively open throat. At the maximum thickness of the pump element blades approximately 25% of the meridional entrance flow is obstructed.

Another specific characteristic of this invention is the provision of aspect ratios (being the ratio of the width W of each blade or vane to its radial length L) which does not vary in a substantial manner between the pump, stator to turbine element. For example, the aspect ratio of a stator vane of the preferred embodiment, taken at the entrance is approximately 1, and taken at the exit it is approximately 1.14 (the mean aspect ratio would be approximately 1.09). The turbine element has an aspect ratio of approximately 1.55 at the exit and approximately 1.72 at the entrance, with a mean aspect ratio of approximately 1.64. The impeller blades have an aspect ratio at the entrance of approximately 1.025 and a measured aspect ratio at the exit of approximately .775, with a resulting mean aspect ratio of .90. Whereas, in prior art, a distinction has been drawn as to keeping the turbine blades and stator vanes of decidely different aspect ratios, this invention contemplates maintaining the aspect ratios relatively close.

Among other factors determinative of the stall torque developed in a torque converter of the character of the type under consideration, are the forces of action and re-action resulting from the peripheral components of the velocities of flow of the working fluid entering and leaving the single stage of turbine blading. The magnitlde of the force developed by these peripheral components of the flow is obviously a function of the mass of working fluid circulated per unit of time, consequently it follows that, other things being equal, an increase in the rate flow f the working fluid under stall conditions will result in n increase of the stall torque ratio developed. Accordingly, the flow circuit and the nature of disposition of lading is arranged to produce as nearly as possible the maximum rate of flow at stall for a given hydraulic head developed by the impeller. The inner and outer return end sections are kept substantially free of blading; the blades or vanes of all the elements are maintained relatively short; the radial length of the combined blades of the turbine and impeller is reduced; and the placement of leading edges of the turbine blades in close proximity to the trailing edges of the impeller blades insures the most efficient utilization of the maximum velocity of the fluid leaving the impeller blades, which velocity is not uniform across the space between the outlet edges of the adjacent impeller blades.

The high stall torque ratio obtained, coupled with the increase in the wide utility range is afforded by choking at the stator element and by an improved definition of the flow channels along with other attendant design factors which contribute to the formation of a novel circuit.

With the improved utility ratio, the absorption of torque by the pumping element from the engine will remain approximately constant for any given speed ratio of the torque converter.

The operation of the transmission should be largely obvious from the foregoing description.

In FIGURE 15 is graphically illustrated certain of the operating characteristics of the preferred embodiment of this invention as compared to a typical three-element torque converter which is commonly known in the art today. These curves, shown in solid line, represent actual test data of the embodiment of this invention, and those shown in broken outline represent test data of a typical prior art torque converter. It can be readily seen from these curves that there is considerable gain in stall torque ratio by use of this invention accompanied by little torque ratio loss at the high end of the speed ratio range. The K-factor (which is speed divided by the square root of the torque) shows a more desirable curve for the preferred embodiment which is generally flat in the mid-range with a slight rise at both ends of the curve. In contrast, the prior art device does not have a generally flat K curve in the mid-range. In the inset chart at the right-hand corner of FIGURE 15, is shown the variation of stall torque ratio with different input r.p.m.'s for the preferred embodiment. A general high attainment of stall torque ratios with various speeds is evident.

The utility ratio is most significant in that it represents the value of the speed ratios taken at each of the points where the curve crosses the 70% efficiency value; the greater this value the more desirable the utility ratio. For preferred embodiment, the utility ratio is approximately 3.7 as opposed to 3.4 for the prior art device. The maximum efficiency for the preferred embodiment is approximately 88% while that for the prior art device is approximately 82%. In each category, the preferred embodiment has increased the overall operating characteristics by the use of the structural features described herein.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

I claim:
1. A hydrodynamic device, comprising: a fixed housing carrying a vaned stator element, rotatable bladed pump and turbine elements cooperating with said housing and stator element to define a toroidal chamber with the vanes and blades disposed therein, said pump element being effective to promote fluid flow therein, having both a circulatory motion about the toroidal axis and a vortical motion about the path of the circulatory flow, said pump and turbine blades lying in the radially outward vortical flow and the stator vanes lying in the radially inward vortical flow, the housing and stator vanes cooperating to provide restriction to the vortical flow which is greater than in any other portion of said chamber, and at least 45% of the meridional vortical flow is obstructed at said restriction.

2. A hydrodynamic torque converter comprising: a housing structure having a central axis, a single stage pump element rotatable about said axis and having a ring of impeller blades, a single stage turbine rotatable about said axis and comprising a ring of turbine blades, and a siad axis and comprising a ring of turbine blades, and a rotationally stationary stator element having a ring of guide vanes concentric with said axis, said housing structure and said element together providing a closed toroidal fluid circuit having spaced inner and outer toroidal walls concentric with said axis for circulatory working of fluid therebetween, said circuit comprising a radially extending outflow section and a radially extending inflow section with smoothly curved bladeless inner and outer return bend sections connecting said outflow and inflow sections, said ring of pump blades and said ring of turbine blades being located in said outflow section with the turbine blades immediately adjacent to and radially outwardly of the pump blades, said stator having a throat area for flow therethrough which provides the restriction primarily governing the rate of circulation of the working fluid resulting from any given hydraulic head developed by the pump element, the ratio of the fifth power of each of the toroidal radius of the pump element exit to the toroidal radius of stator element exit is generally 1.05.

3. A hydraulic torque converter as in claim 2, in which in inner and outer walls of the pump and turbine elements are defined in a radially outwardly converging channel section representing the outflow section, said section having a convergence such that at any given point therealong the product of the toroidal radius and the width of the turbine or impeller element blade will remain generally constant.

4. A hydraulic torque converter as in claim 2, in which the curvature of the walls of the inner return bend section of the circuit provides a variation in the cross sectional free flow area therethrough which is constant, and the ratio of the minimum radius of the torque converter to the radius of curvature of the outer wall at the inner return bend section is approximately 1.2.

References Cited by the Examiner
UNITED STATES PATENTS

| | | | |
|---|---|---|---|
| 3,016,709 | 1/1962 | Lysholm | 60—54 |
| 3,192,719 | 7/1965 | Krongard | 60—54 |
| 3,212,265 | 10/1965 | Neuber | 60—54 |
| 3,261,166 | 7/1966 | Volker et al. | 60—54 |

EDGAR W. GEOGHEGAN, *Primary Examiner.*